United States Patent Office 3,008,898
Patented Nov. 14, 1961

3,008,898
METHOD OF INHIBITING CORROSION
William B. Hughes, Webster Groves, Mo., assignor to Cities Service Research and Development Company, New York, N.Y., a corporation of New Jersey
No Drawing. Filed June 26, 1959, Ser. No. 822,996
8 Claims. (Cl. 252—8.55)

This application is a continuation-in-part of my copending application, Serial Number 706,270, filed December 31, 1957, now abandoned.

This invention relates to inhibiting corrosion of metals, and more particularly relates to an improved composition and process for the prevention of corrosion in natural gas production, collection and distribution systems.

In the production of natural gas, and especially when the producing wells are high pressure wells of the type generally known as gas-condensate wells, some water, along with condensible hydrocarbon fluids, tends to condense out of the gas and coat the walls of the gathering and distribution lines. When carbon dioxide or traces of organic acids are present in the gas, as is generally the case, they tend to dissolve in the condensed water to form highly corrosive solutions which rapidly eat their way through the lines.

Various methods have been proposed in the past for controlling this type of corrosion. In larger systems such as main gas lines it has sometimes been found profitable to install gas dryers, but the expense of installing such dryers is usually prohibitive in small systems, especially in gas collecting lines where the corrosion problem is most acute. In such lines certain chemical inhibitors have been found to be of some use, but even the best of the inhibitors now commercially available have not proven entirely satisfactory. While they do reduce corrosion to some extent, even with their use corrosion continues to such an extent as to pose a serious economic problem.

I have now discovered that corrosion of the type described above may be substantially inhibited by introducing into the production, collection and distribution lines as well as associated equipment, including tanks, a small but sufficient quantity of an imidazoline-imidazoline guanylimine compound prepared by first reacting a polyamine with an acid to produce an intermediate imidazoline compound which is thereafter reacted with an equimolar amount of a dicyandiamide under conditions which effect the formation of an imidazoline ring on the amine containing side chain of the intermediate imidazoline compound. The resulting imidazoline-imidazoline guanylimine compound possesses unexpected and superior corrosion inhibiting properties.

In preparing these new compounds which have been found to be uniquely effective as corrosion inhibitors, I first prepare the intermediate imidazoline compound by reacting equimolar amounts of a low molecular weight polyamine, preferably a polyethylene amine with a carboxylic acid under conditions which effect the removal of two mols of water from the reaction mixture. This is generally accomplished by azeotropic distillation with two mols of water being removed from the reaction mixture for each mol of polyamine used. After production of the intermediate imidazoline compound one mol of dicyandiamide is added and heating continued at a temperature from about 175° to about 250° for a period of from one to about six hours or at least until no further liberation of ammonia is detected. The imidazoline-imidazoline quanylimine products obtained according to the foregoing reaction are generally brown to yellow in color and soluble in oil. The reaction by which the new and improved compounds of my invention are obtained may be represented as follows:

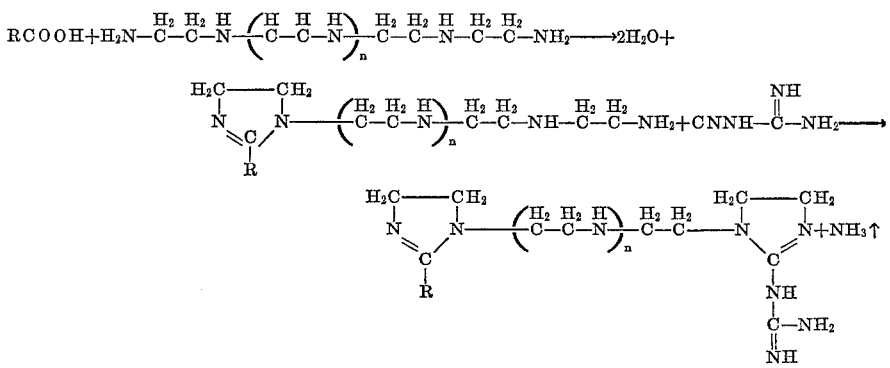

In the final imidazoline-imidazoline guanylimine reaction product, R represents a hydrocarbon radical having from one to eighteen carbon atoms and $n$ is a number from 0 to 1. The radical R is the residue of the monobasic acid used in forming the imidazoline ring. Radical R is saturated or unsaturated and depending on the acid selected will represent an alkyl or alkenyl group having from 1 to 18 carbon atoms, hydroxyalkyl, aryl, alkaryl, acyl or aralkyl group.

In preparing these new imidazoline-imidazoline guanylimine compounds the intermediate imidazoline compound is prepared by utilizing a polyethyleneamine selected from the group consisting of triethylene tetramine and tetraethylene pentamine. If available, other high molecular weight polyalkyleneamines may be used.

With respect to the acid used in preparing the imidazoline compound any suitable low molecular weight acid having from 1 to 18 carbon atoms can be used. Among the acids suitable for the purpose of this invention are: acetic, propionic, butyric, valeric, caproic, caprylic, pelargonic, capric, undecenoic, lauric, myristic, pentadecoic, palmitic, margaric, stearic and ricinoleic acids. In addition to the foregoing aliphatic monocarboxylic acids, unsaturated monocarboxylic acids including arylic, crotonic, isocrotonic, vinylacetic, B-pentenoic, hydrosorbic, isohydrosorbic, pyroterebic, teracrylic, myristolenic, palmitolenic, oleic and linoleic may be user. Aromatic acids including benzoic and substituted aromatic acids including hydroxybenzoic and toluic acids are also suitable.

In order to more fully understand the nature of the compounds of my invention, the manner in which they are prepared and the method by which they may be utilized in protecting metal surfaces from corrosive action, the following specific examples are provided:

EXAMPLE 1

To 146 grams (1 mol) of triethylene tetramine, 285 grams (1 mol) of oleic acid is added. This mixture is charged to a reflux column equipped with a decanter head. 50 ml. of xylene is added and the mixture refluxed at a temperature of about 140° C. for a period of 3½ hours after which time 36 grams (2 mols) of water have been removed. At this point 84 grams (1 mol) of dicyandiamide is added and heating conducted at a temperature of about 180° C. until no further ammonia evolution is noted. The product obtained after distillation of the xylene is brownish in color and has a molecular weight of 462. The product is oil soluble.

This product when tested as a corrosion inhibitor provided the protection indicated under inhibitor No. 1 in the table which follows.

EXAMPLE 2

Following the procedure set forth in Ex. 1, one mol of butyric acid is reacted with one mol of triethylene tetramine. After recovery of two mols of water of condensation, one mol of dicyandiamide is added to the intermediate imidazoline product. Reaction of the dicyandiamide and intermediate imidazoline compound is carried out by heating the mixture at a temperature of about 180° for a period of four hours. At that time no further ammonia evolution will be detected indicating formation of the imidazoline ring on the intermediate imidazoline reaction product. The final product has a molecular weight of 262, is lemon-yellow in color and oil soluble.

This compound is identified as inhibitor No. 2 in the table which follows.

EXAMPLE 3

Following the procedure of the foregoing examples, one mol of benzoic acid is reacted with one mol of triethylene tetramine in the presence of a xylene-azeotrope-forming solvent. After reflux of this reaction mixture is carried out for a period of approximately four hours, two mols of water representing a theoretical amount of water, is recovered due to the formation of the imidazoline ring. After formation of the imidazoline ring, one mol of dicyandiamide is added and heating continued until no further evolution of ammonia is detected. After distillation of the xylene solvent, the final imidazoline-imidazoline guanylimine product is recovered. The product is a yellow syrup and has a molecular weight of 290. The theoretical molecular weight for this imidazoline-imidazoline guanylimine compound is 299.

The test results of protection provided by the product of this example will be found under inhibitor No. 3 in the table following.

EXAMPLE 4

To 25 grams (1/10 mol) of palmitic acid, 14.6 grams (1/10 mol) of triethylene tetramine is added with the mixture being charged to a reflux column equipped with a decanter head. To the reactant mixture 50 ml. of toluene is added and the mixture refluxed for about four hours until two mols of water has been removed from the reaction zone.

At this point 8.4 grams of dicyandiamide is added to the reaction zone and heating continued at a temperature of from about 175° to about 250° C. After the ammonia evolution has ceased, heating is discontinued and the reaction product recovered in the manner described.

EXAMPLE 5

According to the method set forth in the above examples, an imidazoline-imidazoline guanylimine product is obtained by reacting one mol of triethylene tetramine with one mol of ricinoleic acid. The intermediate product obtained is further reacted with one mol of dicyandiamide to yield a product identified as inhibitor No. 5 in the table which follows.

EXAMPLE 6

To 18.9 grams (1/10 mol) of tetraethylene pentamine, 6 grams (1/10 mol) of acetic acid is added together with approximately 50 ml. of xylene. Azeotropic distillation of the reaction mixture produced two mols of the water of condensation. After recovery of the two mols of water 8.4 grams (1/10 mol) of dicyandiamide was added. The reaction mixture was then heated until no further evolution of ammonia was noted.

The product, a yellow oil, was tested as a corrosion inhibitor and provided the protection indicated by inhibitor No. 6 in the table which follows.

EXAMPLE 7

According to the method of Example 6, one mol of tetraethylene pentamine is reacted with one mol of butyric acid to form an intermediate imidazoline compound. This intermediate product is thereafter reacted with an equimolar amount of dicyandiamide to yield a final imidazoline-imidazoline guanylimine product. This product is identified as inhibitor No. 7 in the table.

EXAMPLE 8

To 20 grams (1/10 mol) of lauric acid, 18.9 grams (1/10 mol) of tetraethylene pentamine is added. The reaction mixture is refluxed in the presence of an azeotrope solvent (benzene) at a temperature and for a period of time sufficient to remove from the reaction zone two mols of water.

After formation of the imidazoline ring, 8.4 grams (1/10 mol) of dicyandiamide is added to the product of the first reaction. This reaction mixture is then heated at a temperature of between 170° and 250° C. until no further ammonia evolution is detected. The lack of further ammonia evolution indicates the formation of a imidazoline ring and the production of an imidazoline-imidazoline guanylimine compound.

EXAMPLE 9

Following the procedure of the foregoing examples, 18.9 grams of tetraethylene pentamine is reacted with 28 grams of oleic acid in the presence of a sufficient azeotrope-forming solvent to obtain removal under azeotropic distillation conditions of two mols of water from the reaction mixture. After recovery of the two mols of water indicating formation of the imidazoline ring, 8.4 grams of dicyandiamide is added. The mixture is then heated at a temperature of at least 170° C. until no further ammonia is evolved. The absence of ammonia evolution indicates formation of the imidazoline ring and the production of the imidazoline-imidazoline guanylimine compound.

This product provides the protection indicated for inhibitor No. 9 in the table which follows.

EXAMPLE 10

In a manner similar to the foregoing examples an imidazoline is prepared by reacting equimolar amounts of benzoic acid and tetraethylene pentamine. Water of condensation is removed from the reaction mixture by azeotropic distillation. The intermediate imidazoline product is then further reacted with an equimolar amount of dicyandiamide under conditions of heat sufficient to remove one mol of ammonia from the reaction mixture. Recovery of the molar amount of ammonia indicates formation of the imidazoline ring and the production of the imidazoline-imidazoline guanylimine product.

This final product is identified as inhibitor No. 10 in the table.

EXAMPLE 11

To 35.5 grams of ricinoleic acid (1/10 mol), 18.9 grams of tetraethylene pentamine (1/10 mol) was added together with 50 ml. of xylene. The mixture was refluxed at a temperature of about 130° for approximately four hours at the end of which time 3.6 grams of water was recovered.

After recovery of the theoretical amount of water indicating formation of the imidazoline ring, 8.4 grams (1/10 mol) of dicyandiamide was added to a mixture and heating continued at a temperature of about 200° until no further ammonia was evolved.

The final product recovered was tested as a corrosion inhibitor and provided the protection indicated for inhibitor No. 11 in the table which follows.

The effectiveness of the new imidazoline-imidazoline guanylimine compounds of the present invention, as corrosion inhibitors, will be evident from the table which follows wherein results of the protection afforded by these compounds in inhibiting corrosion is set forth.

The test adopted in comparing the effectiveness of the various compounds of this invention utilizes prepared brines which substantially duplicate corrosion conditions met in oil field operations. While the tests were conducted primarily on these prepared brines, it is, of course, understood that the compounds of my invention may be utilized under a wide variety of corrosion conditions. This test is generally referred to as a static test, since no movement of test strips is made after the test strip has been immersed in the brine. This is to be contrasted with the dynamic test described in my copending application, Serial Number 552,264, filed December 12, 1955, now U.S. Patent No. 2,940,927, wherein the test strip is continuously dipped in the corrosive brine over a fixed period of time.

The test procedure used herein involved a measurement of the corrosive action of a hypothetical well fluid as inhibited with compositions described above upon weighed, cleaned, and polished strips of number 18 gauge, cold rolled steel measuring one-quarter inch by four inches, under conditions closely approximating those existing in a producing well and a comparison thereof with the results obtained by subjecting identical strips to the corrosive action of the hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about 1 hour to purge any oxygen present. After the purging was completed, the corrosion inhibitor being tested was added to each flask in amounts of 50 and 100 p.p.m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times, precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus a protection percent may be calculated for each of the test strips taken from the inhibited test fluids in accordance with the following formula:

$$\frac{L1-L2}{L1} \times 100 = \text{percent protection}$$

in which $L1$ is the loss in weight of strips taken from uninhibited test fluids, and $L2$ is the loss in weight of strips which were subjected to inhibited test fluids.

Following the procedure outlined above, the compounds prepared according to Examples 1, 2, 3, 5, 6, 7, 9, 10, and 11 were tested as corrosion inhibitors. The result of these tests clearly demonstrate the effectiveness of the new imidazoline-imidazoline guanylimine compound of this invention in providing protection against the undesirable reaction of corrosive fluids.

Table

| Inhibitor No. | Composition | Percent Protection | |
|---|---|---|---|
| | | 50 ppm. | 100 ppm. |
| | TETA-HOAC-Dicyandiamide | 72.8 | 89.9 |
| 2 | TETA-Butyric-Dicyandiamide | 86.1 | 93.2 |
| 1 | TETA-Oleic-Dicyandiamide | 93.2 | 96.8 |
| 3 | TETA-Benzoic-Dicyandiamide | 80.1 | 90.1 |
| 5 | TETA-Ricinoleic-Dicyandiamide | 93.9 | 98.3 |
| 6 | TEPA-HOAC-Dicyandiamide | 80.9 | 96.8 |
| 7 | TEPA-Butyric-Dicyandiamide | 87.3 | 94.0 |
| 9 | TEPA-Oleic-Dicyandiamide | 92.8 | 99.0 |
| 10 | TEPA-Benzoic-Dicyanidamide | 81.8 | 87.8 |
| 11 | TEPA-Ricinoleic-Dicyandiamide | 93.0 | 98.7 |

As indicated in the table, the lower molecular weight compounds, e.g. acetic, are not as effective as the higher molecular weight compounds such as for example oleic or ricinoleic. Similarly, when the acid used in preparing the imidazoline ring portion of the imidazoline-imidazoline compound is an aromatic acid such as benzoic acid, the protection afforded by the final imidazoline-imidazoline guanylimine compound is not as great as the protection provided by higher molecular weight aliphatic acids. This will be apparent from a comparison of the percent protection provided by inhibitor No. 3 and 10 as compared with the inhibitors identified as 1 and 9. The reason for the slightly better protection provided by aliphatic compounds is not readily understood though in some way is probably related to the length of the carbon chain on the imidazoline ring portion of the imidazoline-imidazoline guanylimine compound.

In using the imidazoline-imidazoline guanylimine compounds of this invention in protecting metal surfaces particularly iron including piping, casing, storage equipment and other metal surfaces which come in contact with corrosive fluids, I have found that excellent results are obtained by injecting an appropriate quantity of a selected inhibitor in an amount generally not more than from 1,500 to 2,000 p.p.m. of the inhibiting compound into the producing well or pipe line or other metallic container so that it can mingle with the fluid contained therein and come in contact with the metal surface. If desired, the selected corrosion inhibitor compound may be used in amounts greater than 2,000 p.p.m. The upper limit on the quantity of these unique compounds is their cost which in treating oil wells on a per barrel basis becomes prohibitive when used in amounts greater than about 2% by volume.

In treating oil wells, the inhibiting compound may be introduced directly into the top of the casing either with or without an inert carrier such as kerosene, gas oil, or other similar materials and be permitted to flow down into the well and back through the tubing and into associated apparatus. I have found that if this procedure is followed substantial reduction in corrosion throughout the producing and collecting systems may be obtained.

The manner in which these new compositions effect the protection of metal surfaces is not readily apparent. They do preferentially wet the surface of the metal and apparently thereby exclude corrosive fluids or materials from coming in contact with the metal surface. In any event, despite the lack of a complete understanding of the mechanism by which this protective effect is obtained, these new compounds are extremely and surprisingly effective in protecting metal surfaces.

It is to be understood that the improved compounds of my invention are not limited to use alone or singly, and may be applied along with other agents commonly introduced into producing wells for breaking emulsions, preventing scale formation, minimizing pitting, etc. It is further evident that my invention is not restricted to the use of these new compounds in inhibiting oil well corrosion, but may be employed to perform this protective function in the presence of corrosive fluids derived from many other sources.

What I claim is:

1. The method of preventing corrosion of ferrous metals when exposed to contact with corrosive fluids which includes an acidic component selected from the group consisting of carbon dioxide and hydrogen sulfide which comprises introducing into the corrosive fluids a small amount, sufficient to inhibit corrosion, of a compound having the following formula:

H₂C——CH₂              H₂C——CH₂
 |    |                |    |
 N   N(CH₂CH₂NH)₂CH₂CH₂N    N
  \\ /                  \\ //
   C                     C
   |                     |
   R                     HNCNH₂
                         ‖
                         NH wherein R is a member of the group consisting of alkyl and alkenyl radicals having from 1 to 18 carbon atoms, phenyl, salicyl and tolyl and passing the corrosive fluid in contact with the metal to be protected.

2. The method of preventing corrosion as defined in claim 1 wherein the compound has the formula:

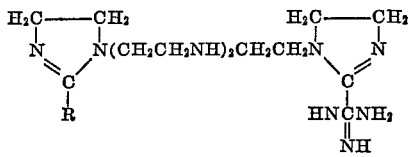

3. The method of preventing corrosion as defined in claim 1 wherein the compound has the formula:

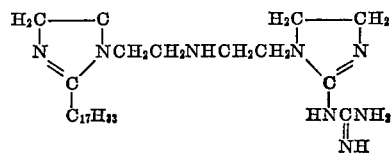

4. The method of preventing corrosion as defined in claim 1 wherein the compound has the formula:

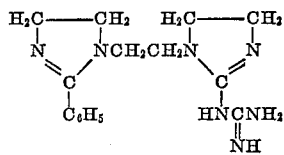

5. The method of preventing corrosion as defined in claim 1 wherein the compound has the formula:

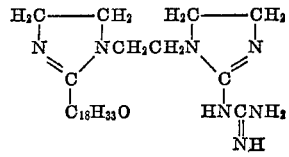

6. The method of preventing corrosion as defined in claim 1 wherein the compound has the formula:

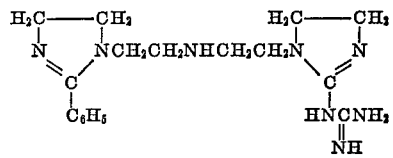

7. The method of preventing corrosion as defined in claim 1 wherein the compound has the formula:

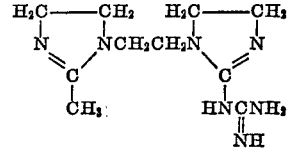

8. The method of preventing corrosion as defined in claim 1 wherein the compound has the formula:

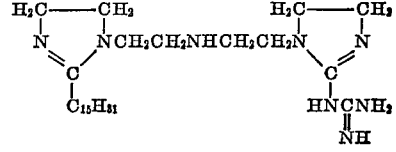

References Cited in the file of this patent

UNITED STATES PATENTS

| | | |
|---|---|---|
| 2,468,163 | Blair et al. | Apr. 26, 1949 |
| 2,483,969 | Gajewski | Oct. 4, 1949 |
| 2,700,652 | Menaul | Jan. 25, 1955 |
| 2,819,284 | Shen | Jan. 7, 1958 |
| 2,881,139 | Gysling | Apr. 7, 1959 |
| 2,924,605 | Hughes | Feb. 9, 1960 |

UNITED STATES PATENT OFFICE
CERTIFICATION OF CORRECTION

Patent No. 3,008,898                                        November 14, 1961

William B. Hughes

It is hereby certified that error appears in the above numbered patent requiring correction and that the said Letters Patent should read as corrected below.

Column 2, line 60, for "user" read -- used --; column 7, lines 44 to 48, the left-hand position of the formula should appear as shown below instead of as in the patent:

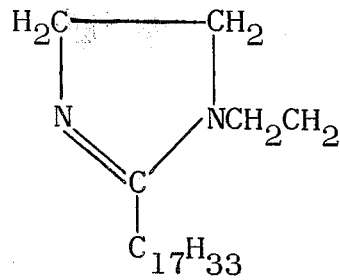

Signed and sealed this 17th day of April 1962.

(SEAL)
Attest:

ESTON G. JOHNSON                                DAVID L. LADD
Attesting Officer                               Commissioner of Patents

UNITED STATES PATENT OFFICE
CERTIFICATION OF CORRECTION

Patent No. 3,008,898                        November 14, 1961

William B. Hughes

It is hereby certified that error appears in the above numbered patent requiring correction and that the said Letters Patent should read as corrected below.

Column 2, line 60, for "user" read -- used --; column 7, lines 44 to 48, the left-hand position of the formula should appear as shown below instead of as in the patent:

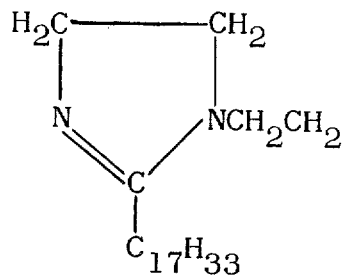

Signed and sealed this 17th day of April 1962.

(SEAL)
Attest:

ESTON G. JOHNSON
Attesting Officer

DAVID L. LADD
Commissioner of Patents

Attest: